(12) United States Patent
Sadek et al.

(10) Patent No.: US 7,711,031 B2
(45) Date of Patent: May 4, 2010

(54) ADAPTIVE TECHNIQUE FOR INTER-CARRIER-INTERFERENCE CANCELING IN OFDM SYSTEMS

(75) Inventors: Mirette Sadek, Cairo (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 531 days.

(21) Appl. No.: 11/766,814

(22) Filed: Jun. 22, 2007

(65) Prior Publication Data

US 2008/0317153 A1    Dec. 25, 2008

(51) Int. Cl.
 *H04L 27/30* (2006.01)
(52) U.S. Cl. ............... 375/144; 375/148; 375/285; 375/346; 455/67.13; 455/296; 455/226.3; 370/319; 370/480
(58) Field of Classification Search ............... 375/144, 375/148, 265, 267, 341, 346, 347; 455/226.1, 455/226.2, 226.3, 501, 504, 506, 63.1, 67.11, 455/67.13, 296; 370/208, 210, 252, 319–321, 370/342–344, 480, 491, 497
See application file for complete search history.

(56) References Cited

U.S. PATENT DOCUMENTS

| 7,586,976 | B1 * | 9/2009 | Duggan ............... 375/144 |
| 2004/0184550 | A1 | 9/2004 | Yoshida et al. |
| 2007/0053453 | A1 | 3/2007 | Yeh et al. |
| 2008/0049852 | A1 * | 2/2008 | Lee ............... 375/260 |
| 2008/0101484 | A1 * | 5/2008 | Wu et al. ............... 375/260 |
| 2008/0159420 | A1 * | 7/2008 | Tseng et al. ............... 375/260 |

* cited by examiner

*Primary Examiner*—Dac V Ha
(74) *Attorney, Agent, or Firm*—Rahman LLC

(57) ABSTRACT

ICI canceling in an OFDM system includes taking a FFT of a wireless electrical signal to produce an OFDM signal; estimating a DC component of a frequency-selective channel in the OFDM system; obtaining an initial estimate of data symbols associated with data bits of the OFDM signal; correcting the data bits with a Viterbi decoder; encoding the corrected data bits to acquire corrected data symbols; re-estimating the DC component of the frequency-selective channel using the corrected data symbols; filtering the corrected data symbols and sub-carrier of the frequency-selective channel; calculating a first order differential function of the frequency-selective channel based on successive ones of the corrected data symbols; removing an ICI component from the calculated first order differential function; and re-estimating the data symbols as a function of the removed ICI component. The filtering occurs using a low pass filter comprising a bank of eight filters.

20 Claims, 5 Drawing Sheets

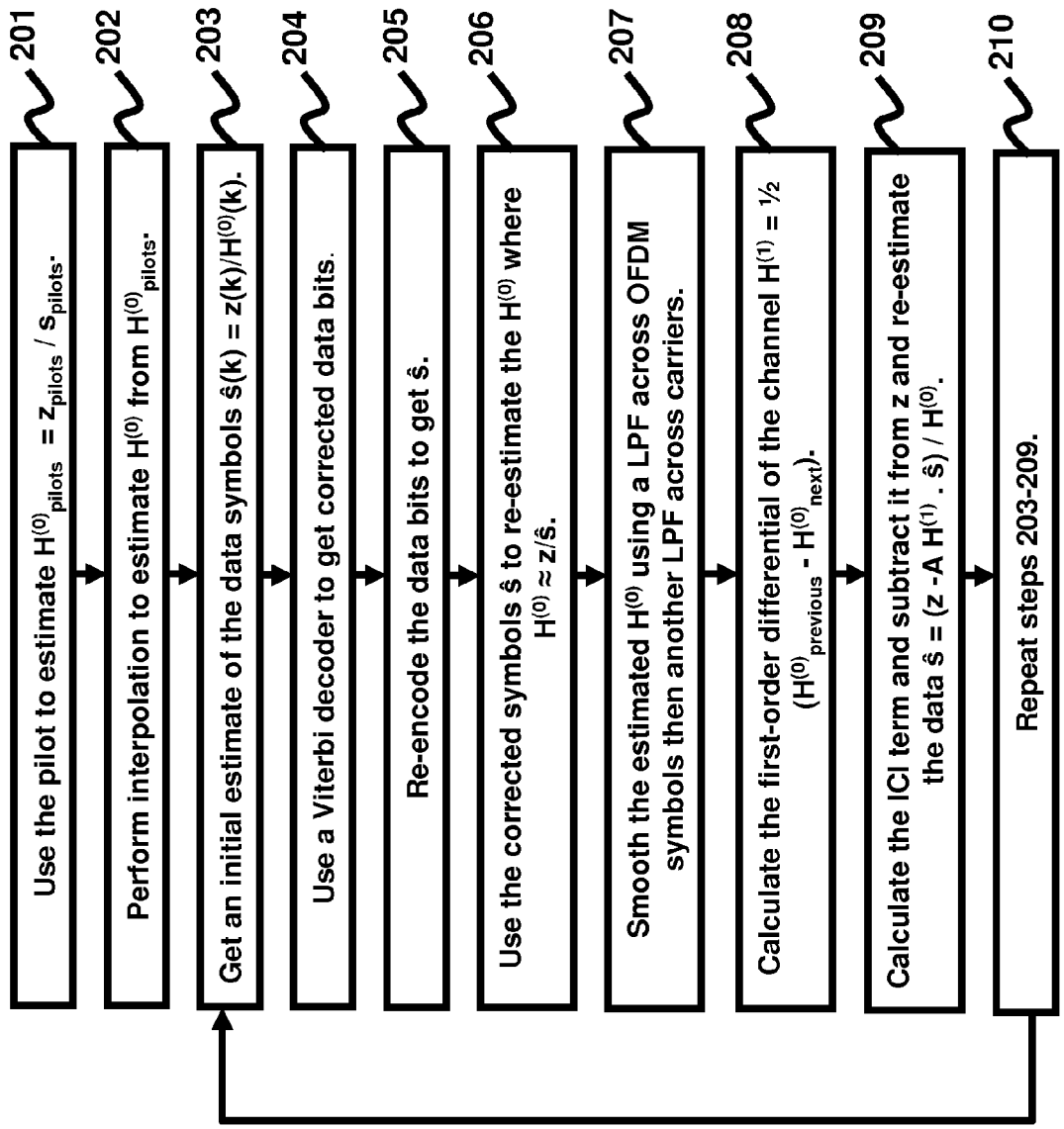

FIG. 2

201 — Use the pilot to estimate $H^{(0)}_{pilots} = z_{pilots} / s_{pilots}$.

202 — Perform interpolation to estimate $H^{(0)}$ from $H^{(0)}_{pilots}$.

203 — Get an initial estimate of the data symbols $\hat{s}(k) = z(k)/H^{(0)}(k)$.

204 — Use a Viterbi decoder to get corrected data bits.

205 — Re-encode the data bits to get $\hat{s}$.

206 — Use the corrected symbols $\hat{s}$ to re-estimate the $H^{(0)}$ where $H^{(0)} \approx z/\hat{s}$.

207 — Smooth the estimated $H^{(0)}$ using a LPF across OFDM symbols then another LPF across carriers.

208 — Calculate the first-order differential of the channel $H^{(1)} = \frac{1}{2}(H^{(0)}_{previous} - H^{(0)}_{next})$.

209 — Calculate the ICI term and subtract it from z and re-estimate the data $\hat{s} = (z - A\, H^{(1)} \cdot \hat{s}) / H^{(0)}$.

210 — Repeat steps 203-209.

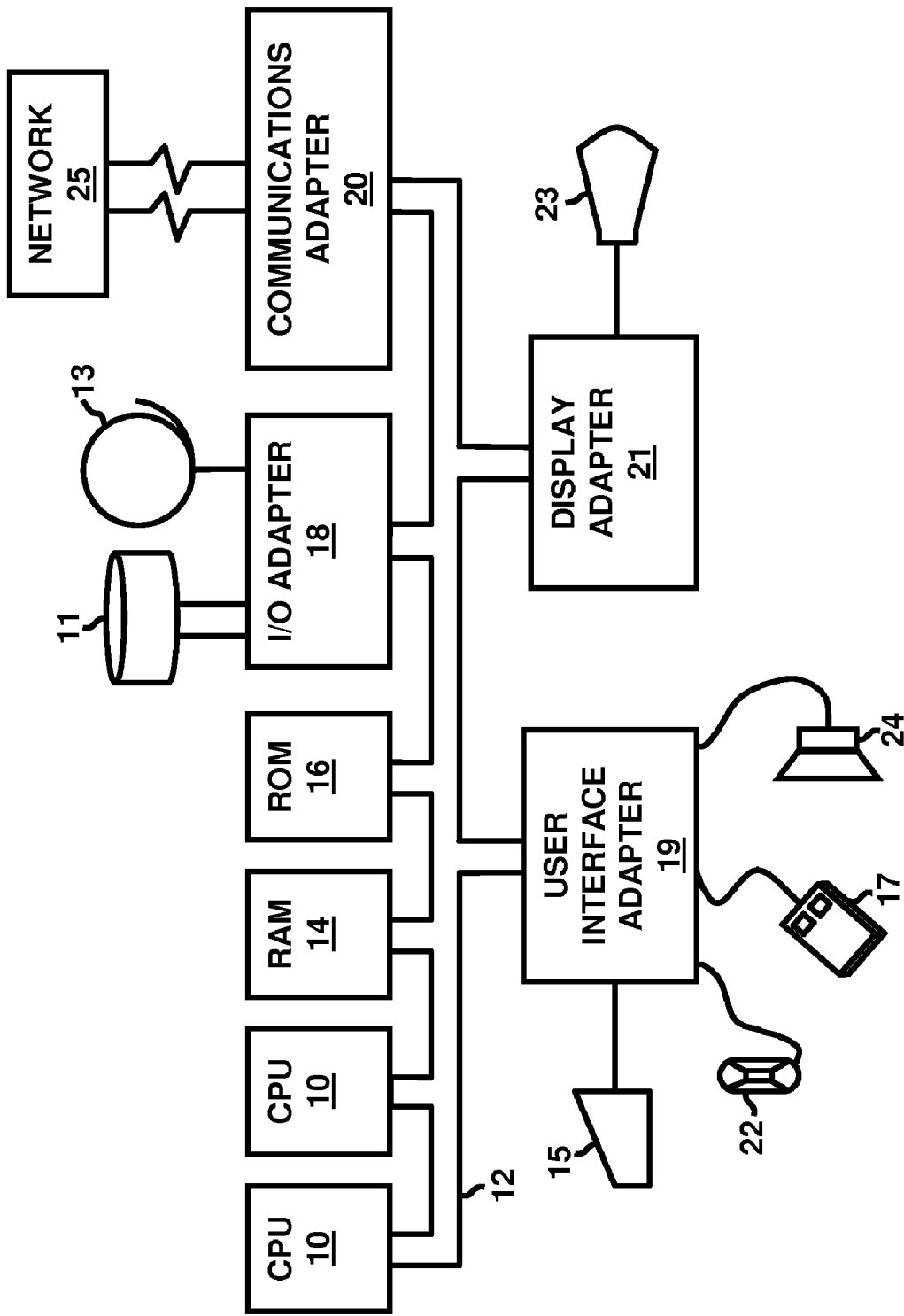

ADAPTIVE TECHNIQUE FOR INTER-CARRIER-INTERFERENCE CANCELING IN OFDM SYSTEMS

BACKGROUND

1. Technical Field

The embodiments herein generally relate to wireless communication systems, and, more particularly, to inter-carrier-interference (ICI) canceling in Orthogonal Frequency-Division Multiplexing (OFDM) systems.

2. Description of the Related Art

OFDM has recently been widely adopted by many wireless communication standards due to its many advantages. One major advantage of OFDM is the effective conversion of a frequency-selective channel into a group of nearly flat sub-channels (carriers) that are easily equalized at the receiver. At high Doppler frequencies, inter-carrier-interference (ICI) occurs. This problem limits the performance of OFDM systems under high Doppler frequencies. Accordingly, there remains a need for a new ICI cancellation technique in OFDM systems.

SUMMARY

In view of the foregoing, an embodiment herein provides a method of adaptively performing ICI canceling in an OFDM system, and a program storage device readable by computer comprising a program of instructions executable by the computer to perform the method comprising taking a Fast Fourier Transform (FFT) of a wireless electrical signal to produce an OFDM signal; estimating a DC component of a frequency-selective channel in the OFDM system; obtaining an initial estimate of data symbols associated with data bits of the OFDM signal; correcting the data bits with a Viterbi decoder; encoding the corrected data bits to acquire corrected data symbols; re-estimating the DC component of the frequency-selective channel using the corrected data symbols; filtering the corrected data symbols and sub-carrier of the frequency-selective channel; calculating a first order differential function of the frequency-selective channel based on successive ones of the corrected data symbols; removing an ICI component from the calculated first order differential function; and re-estimating the data symbols as a function of the removed ICI component. Preferably, the filtering occurs using a low pass filter comprising a bank of filters, wherein the bank of filters preferably comprise eight filters.

The method may further comprise repeating the estimating step through the removing step prior to performing the re-estimating of the data symbols as a function of the removed ICI component. Additionally, the method may further comprise using the re-estimated data symbols to process the OFDM signal for transmission in the OFDM system. Preferably, the first order differential function is based on an immediate preceding and an immediate succeeding data symbol of a current data symbol. Moreover, the method may further comprise mapping an estimated channel length to one of the filters in the bank of filters.

Another embodiment provides a system for adaptively performing ICI canceling comprising a processor adapted to take a FFT of a wireless electrical signal to produce an OFDM signal; estimate a DC component of a frequency-selective channel in the OFDM system; and obtain an initial estimate of data symbols associated with data bits of the OFDM signal. The system further comprises a Viterbi decoder adapted to correct the data bits; an encoder adapted to re-encode the corrected data bits to acquire corrected data symbols; processing means for re-estimating the DC component of the frequency-selective channel using the corrected data symbols; a filter adapted to filter the corrected data symbols and sub-carrier of the frequency-selective channel; processing means for calculating a first order differential function of the frequency-selective channel based on successive ones of the corrected data symbols; processing means for removing an ICI component from the calculated first order differential function; and processing means for re-estimating the data symbols as a function of the removed ICI component.

Preferably, the filter comprises a low pass filter comprising a bank of filters, wherein the bank of filters preferably comprise eight filters. The system may further comprise processing means for using the re-estimated data symbols to process the OFDM signal for transmission in the OFDM system. Moreover, the first order differential function is preferably based on an immediate preceding and an immediate succeeding data symbol of a current data symbol. Additionally, the system may further comprise processing means for mapping an estimated channel length to one of the filters in the bank of filters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 is a flow diagram illustrating an ICI cancellation technique according to an embodiment herein;

FIG. 5 illustrates a schematic diagram of a computer system according to an embodiment herein.

DETAILED DESCRIPTION OF PREFERRED EMBODIMENTS

Figure 1:
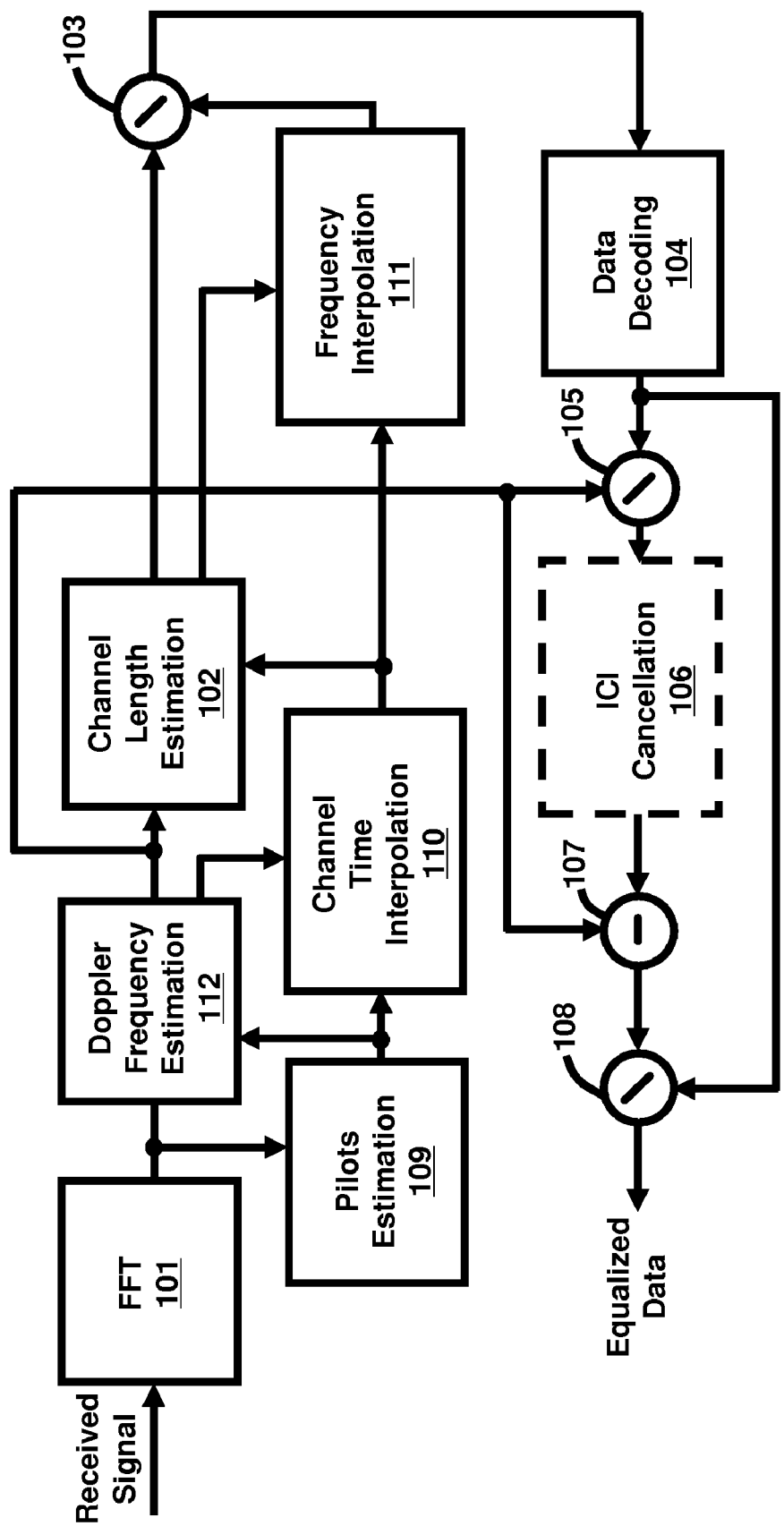
FIG. 1 illustrates a schematic block diagram of a receiver system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new ICI canceling technique in OFDM systems. The embodiments herein achieve this by providing an adaptive technique for ICI canceling in OFDM systems. Referring now to the drawings, and more particularly to FIGS. 1 through 5, where similar reference characters denote corresponding features consistently throughout the figures, there are shown preferred embodiments.

The ICI cancellation technique provided by the embodiments herein begins after taking the Fast Fourier Transform (FFT) of the received signal; the resulting signal vector (z) can be written in terms of the transmitted signal vector (s) as follows for "zero" Doppler frequency:

$$z = H^{(0)} \cdot s + v$$

where $H^{(0)}$ is a diagonal matrix. In this case, the complexity of equalizing the channel is reduced from matrix inversion to scalar inversion. The estimated data symbols are given by:

$$\hat{s}(k) = z(k)/H^{(0)}(k).$$

In this case, no ICI occurs since each channel sub-carrier contributes only to the corresponding symbol; i.e., the data symbol with the same index. In case of non-zero Doppler frequency, the received signal, after FFT, can be modeled by:

$$z = H \cdot s + v$$

where H is an equivalent channel matrix. In this case, H is a full matrix.

This means that ICI exists among different sub-carriers; i.e., the received signal (after FFT) at any sub-carrier is a result of the contribution of the corresponding symbol in addition to the contribution of, theoretically, all the other symbols.

There are two main problems associated with data estimation in this case: (1) Optimum estimation algorithms in this case require matrix inversion whose order is a function of the FFT size and which is not practical to implement; and (2) The full channel matrix H is not readily available and cannot be estimated directly from the received pilots.

Thus, an equivalent channel model in terms of the Taylor expansion of the channel matrix is used:

$$H = \Sigma_p A_p H^{(p)}$$

An approximation of the channel matrix is obtained by considering the first two terms of the expansion and neglecting higher order terms:

$$H \approx H^{(0)} + A H^{(1)}$$

where $H^{(0)}$ is the DC component and $H^{(1)}$ is the first order differential of the channel. A is a coefficient matrix. Thus, z can be written as:

$$z \approx (H^{(0)} + AH^{(1)}) \cdot s + v$$
$$= H^{(0)} \cdot s + AH^{(1)} \cdot s + v$$

the second term (AH) in the above equation represents the ICI. Here, $H^{(0)}$ is a diagonal matrix while $H^{(1)}$ is a full matrix with zeros on the main diagonal.

Based on the above analysis, the ICI term can be cancelled and the data symbols estimated using a suboptimal iterative technique that involves subtracting the ICI term from z and then dividing by $H^{(0)}$. The system block diagram is shown in FIG. 1. After performing FFT (101) on the received signal, the channel is estimated at the pilot positions (109) by dividing the received signal (after FFT) by the pilot symbols known to both the transmitter and the receiver. After a Doppler frequency estimation (112) process occurs, the channel is then interpolated (110) in the time domain using interpolation filters. The time-interpolated channel is used to estimate (102) the channel length (through inverse FFT) and is then interpolated (111) in the frequency domain using interpolation filters. The equalized signal is obtained by dividing (103) the received signal (after FFT) by the estimated channel. The equalized signal is then decoded (104) (for example using a Viterbi decoder as in the Digital Video Broadcast—Handheld (DVB-H) standard). The decoded data is then used as an input to the ICI cancellation block (106) described in more detail below. The ICI block (106) calculates the ICI terms and subtracts (107) it from the received signal (after FFT) to obtain an ICI-free signal. Finally, the ICI-free signal is divided (108) by the estimated channel to obtain the final equalized signal.

The ICI cancellation technique provided by the embodiments herein are shown in FIG. 2. The first step (201) is to use the pilot to estimate $H^{(0)}_{pilots} = z_{pilots}/s_{pilots}$. The second step (202) is to perform interpolation to estimate $H^{(0)}$ from $H^{(0)}_{pilots}$. The third step (203) is to get an initial estimate of the data symbols $\hat{s}(k) = z(k)/H^{(0)}(k)$. The fourth step (204) is to use a Viterbi decoder to get corrected data bits. The fifth step (205) is to re-encode the data bits to get $\hat{s}$. The sixth step (206) is to use the corrected symbols $\hat{s}$ to re-estimate the $H^{(0)}$ where $H^{(0)} \approx z/\hat{s}$. The seventh step (207) is to smooth the estimated $H^{(0)}$ using a low pass filter (LPF) across OFDM symbols then another LPF across carriers. The eighth step (208) is to calculate the first-order differential of the channel $H^{(1)} = \frac{1}{2}(H^{(0)}_{previous} - H^{(0)}_{next})$ where "previous" and "next" refer to the OFDM symbols before and after the current symbol. The ninth step (209) is to calculate the ICI term and subtract it from z and re-estimate the data $\hat{s} = (z - AH^{(1)} \cdot \hat{s})/H^{(0)}$. The tenth step (210) is to repeat steps (203) through (209).

Figure 3:
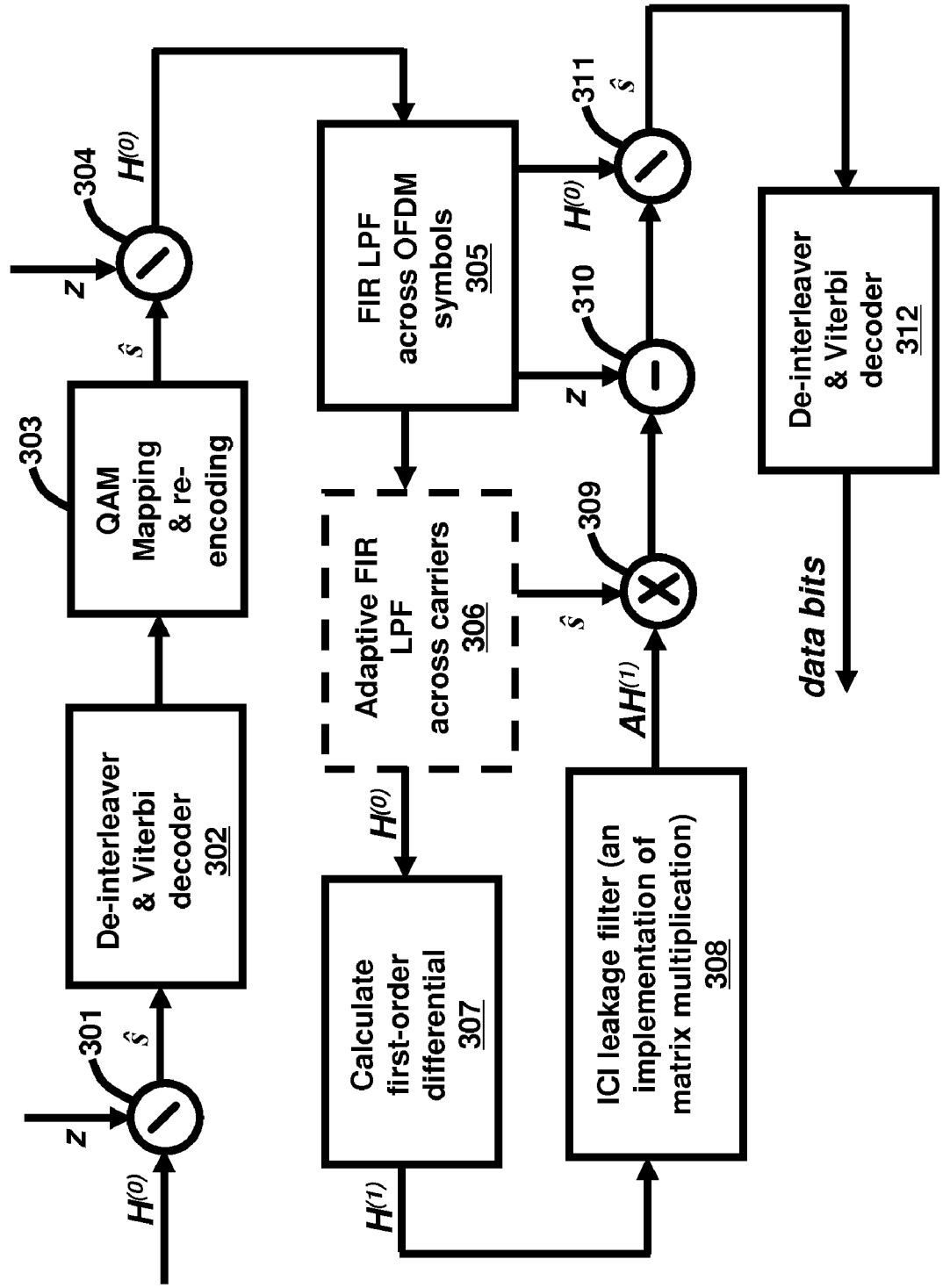
FIG. 3 illustrates a schematic block diagram of an ICI technique according to an embodiment herein.
Figure 4:
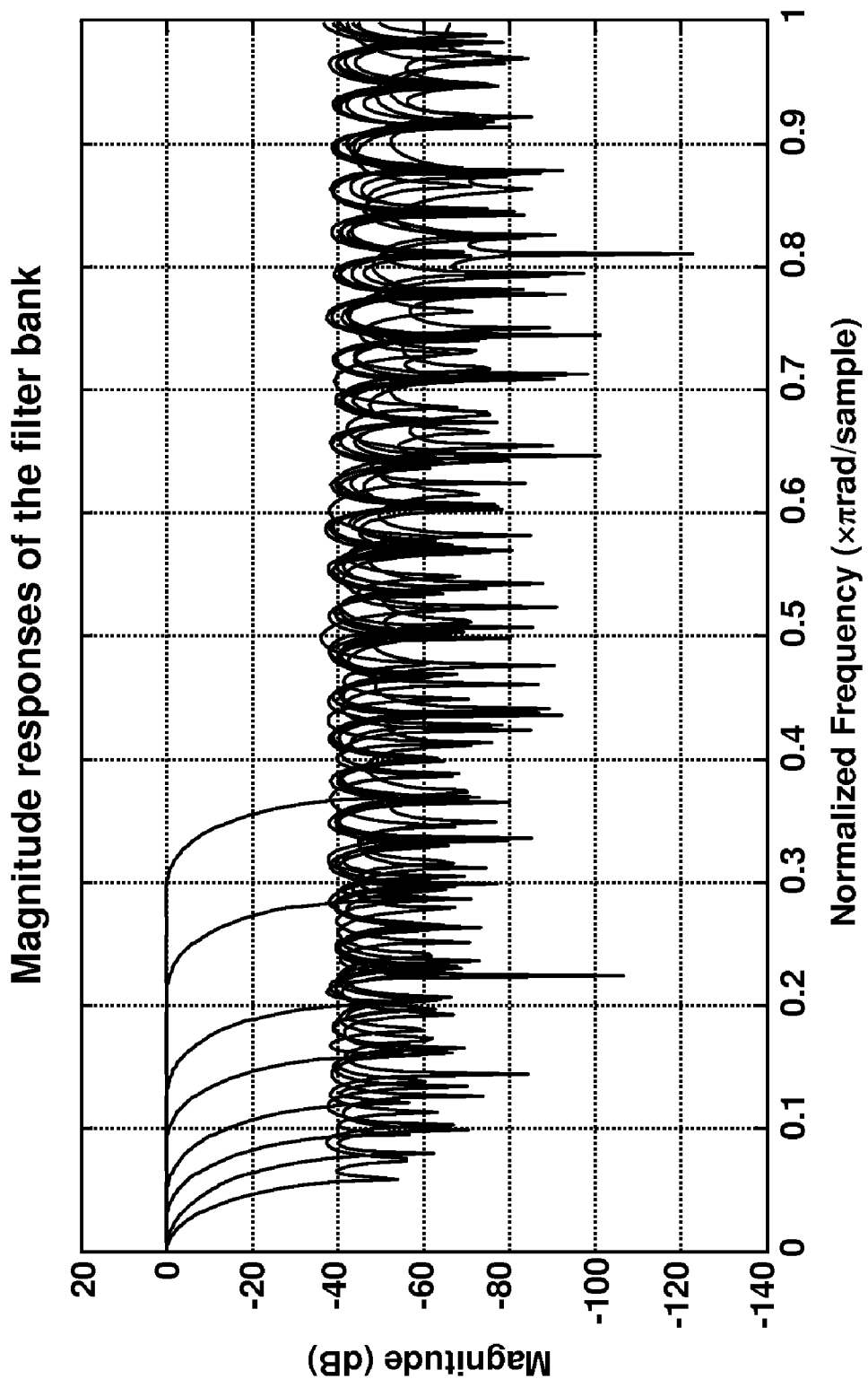
FIG. 4 is a graphical representation illustrating magnitude responses of a filter bank according to an embodiment herein.

According to the embodiments herein the adaptive low pass filter is a filter bank that comprises eight filters. The number of filters (eight) is a an optimally chosen parameter and is specifically selected to cover a wide range of frequencies with reasonable frequency resolution. This specified number of filters (eight) allows the embodiments herein to achieve the superior results that it does. The estimated channel length (maximum delay spread) is mapped to one of the filters in the bank. FIG. 3 shows the ICI block 106 (of FIG. 1) for this technique and FIG. 4 shows the magnitude response of the filters in the FIR smoothing filter bank. As shown in FIG. 4 the low pass FIR filter reduces the noise significantly by filtering out all the noise outside the estimated channel length. In FIG. 3, block 301 divides the DC component of the channel, $H^{(0)}$ by the signal vector, z. Block 302 performs de-interleaving and Viterbi decoding. This removes many bit errors and cleans the signal. Block 303 performs QAM mapping and re-encoding to put the signal in the transmitted form so that it is ready for use in the ICI cancellation process. Block 304 divides the transmitted signal vector, $\hat{s}$ by the signal vector, z. Block 305 is a low pass filter across the OFDM symbols. Its function is to smooth the channel. Block 306 is an adaptive low pass filter across carriers. This block 306 performs another stage of smoothing of the channel across the carriers. This is performed through mapping the channel length to one of the filters in the bank and then performing low pass filtering to smooth the channel. Block 307 calculates the first order differential of the channel as a part of the ICI term. Block 308 implements the matrix multiplication necessary to calculate the ICI term. The multiplication here is replaced by an FIR filtering process. Block 309 multiplies the transmitted signal vector, $\hat{s}$, by the ICI term, $AH^{(1)}$, with the result being subtracted from the signal vector, z in block 310, with the result divided by the DC component of the channel, $H^{(0)}$ in block 311. Block 312 is a de-interleaver and Viterbi decoder.

The techniques provided by the embodiments herein may be implemented on an integrated circuit chip (not shown) and may be used in digital video broadcast systems for handheld devices, and implemented in the baseband chip sets that support standards such as DAB, DAB-IP, and T-DMB, for example. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in hardware may include various processor means such as computer processors (not shown) adapted to perform the functions described herein. The embodiments that are implemented in software include, but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of adaptively performing inter-carrier-interference (ICI) canceling in an Orthogonal Frequency-Division Multiplexing (OFDM) system, said method comprising:

taking a Fast Fourier Transform (FFT) of a wireless electrical signal to produce an OFDM signal;

estimating a DC component of a frequency-selective channel in said OFDM system;

obtaining an initial estimate of data symbols associated with data bits of said OFDM signal;

correcting said data bits with a Viterbi decoder;

encoding the corrected data bits to acquire corrected data symbols;

re-estimating said DC component of said frequency-selective channel using said corrected data symbols;

filtering said corrected data symbols and sub-carrier of said frequency-selective channel;

calculating a first order differential function of said frequency-selective channel based on successive ones of said corrected data symbols;

removing an ICI component from the calculated first order differential function; and re-estimating said data symbols as a function of the removed ICI component.

2. The method of claim 1, wherein said filtering occurs using a low pass filter comprising a bank of filters.

3. The method of claim 2, wherein said bank of filters comprise eight filters.

4. The method of claim 2, further comprising mapping an estimated channel length to one of the filters in said bank of filters.

5. The method of claim 1, further comprising repeating the estimating step through the removing step prior to performing the re-estimating of said data symbols as a function of the removed ICI component.

6. The method of claim 1, further comprising using the re-estimated data symbols to process said OFDM signal for transmission in said OFDM system.

7. The method of claim 1, wherein said first order differential function is based on an immediate preceding and an immediate succeeding data symbol of a current data symbol.

8. A program storage device readable by computer comprising a program of instructions executable by said computer to perform a method of adaptively performing inter-carrier-interference (ICI) canceling in an Orthogonal Frequency-Division Multiplexing (OFDM) system, said method comprising:

taking a Fast Fourier Transform (FFT) of a wireless electrical signal to produce an OFDM signal;

estimating a DC component of a frequency-selective channel in said OFDM system;

obtaining an initial estimate of data symbols associated with data bits of said OFDM signal;

correcting said data bits with a Viterbi decoder;

encoding the corrected data bits to acquire corrected data symbols;

re-estimating said DC component of said frequency-selective channel using said corrected data symbols;

filtering said corrected data symbols and sub-carrier of said frequency-selective channel;

calculating a first order differential function of said frequency-selective channel based on successive ones of said corrected data symbols;

removing an ICI component from the calculated first order differential function; and re-estimating said data symbols as a function of the removed ICI component.

9. The program storage device of claim 8, wherein said filtering occurs using a low pass filter comprising a bank of filters.

10. The program storage device of claim 9, wherein said bank of filters comprise eight filters.

11. The program storage device of claim 9, wherein said method further comprises mapping an estimated channel length to one of the filters in said bank of filters.

12. The program storage device of claim 8, wherein said method further comprises repeating the estimating step through the removing step prior to performing the re-estimating of said data symbols as a function of the removed ICI component.

13. The program storage device of claim 8, wherein said method further comprises using the re-estimated data symbols to process said OFDM signal for transmission in said OFDM system.

14. The program storage device of claim 8, wherein said first order differential function is based on an immediate preceding and an immediate succeeding data symbol of a current data symbol.

15. A system for adaptively performing inter-carrier-interference (ICI) canceling comprising:

a processor adapted to:
   take a Fast Fourier Transform (FFT) of a wireless electrical signal to produce an Orthogonal Frequency-Division Multiplexing (OFDM) signal;
   estimate a DC component of a frequency-selective channel in said OFDM system; and
   obtain an initial estimate of data symbols associated with data bits of said OFDM signal;

a Viterbi decoder adapted to correct said data bits;

an encoder adapted to re-encode the corrected data bits to acquire corrected data symbols;

processing means for re-estimating said DC component of said frequency-selective channel using said corrected data symbols;

a filter adapted to filter said corrected data symbols and sub-carrier of said frequency-selective channel;

processing means for calculating a first order differential function of said frequency-selective channel based on successive ones of said corrected data symbols;

processing means for removing an ICI component from the calculated first order differential function; and processing means for re-estimating said data symbols as a function of the removed ICI component.

16. The system of claim 15, wherein said filter comprises a low pass filter comprising a bank of filters.

17. The system of claim 16, wherein said bank of filters comprise eight filters.

18. The system of claim 16, further comprising processing means for mapping an estimated channel length to one of the filters in said bank of filters.

19. The system of claim 15, further comprising processing means for using the re-estimated data symbols to process said OFDM signal for transmission in said OFDM system.

20. The system of claim 15, wherein said first order differential function is based on an immediate preceding and an immediate succeeding data symbol of a current data symbol.

* * * * *